United States Patent [19]
Bellati et al.

[11] 3,906,730
[45] Sept. 23, 1975

[54] LABYRINTH SEAL WITH BLOCKING MEDIUM

[75] Inventors: Hans Bellati; Helmut Muhlhauser, both of Wettingen, Switzerland

[73] Assignee: BBC Brown Boveri & Company Limited, Baden, Switzerland

[22] Filed: Oct. 5, 1973

[21] Appl. No.: 403,884

[30] Foreign Application Priority Data
Oct. 11, 1972 Switzerland.................. 14790/72

[52] U.S. Cl..................................... 60/657; 277/15
[51] Int. Cl....................... F01d 21/06; F01k 19/00
[58] Field of Search ............... 60/102, 108, 73, 67; 277/3, 15, 53

[56] References Cited
UNITED STATES PATENTS

| | | | |
|---|---|---|---|
| 1,246,039 | 11/1917 | Baumann............................ | 277/15 |
| 3,251,601 | 5/1966 | Harvey................................ | 277/53 |
| 3,414,274 | 12/1968 | Aronson ............................ | 277/15 |

FOREIGN PATENTS OR APPLICATIONS

| | | | |
|---|---|---|---|
| 852,805 | 11/1960 | United Kingdom................. | 277/15 |
| 1,503,612 | 10/1965 | Germany............................ | 277/15 |

*Primary Examiner*—Martin P. Schwadron
*Assistant Examiner*—H. Burks, Sr.
*Attorney, Agent, or Firm*—Pierce, Scheffler & Parker

[57] ABSTRACT

A labyrinth type shaft seal for turbines, particularly turbines for use in nuclear power plants operating with saturated steam comprises a series of labyrinths located along the shaft in a stuffing box located at each end of the turbine together with three axially spaced annular chambers. The axially innermost chamber is connected to the pipe supplying live steam to the turbine by way of a pipe line containing a regulating valve which reduces and then maintains the pressure of the live steam within this innermost chamber at a level slightly above the level of the steam within the exhaust steam space of the turbine so that live steam flows axially in both directions along the shaft. The axially outermost chamber is connected with a steam condenser and a vacuum pump and serves to draw off a mixture of any outside air leaking in along the shaft as well as any steam leaking out along the shaft from the chamber located intermediate the innermost and outermost chambers which performs a compensating function and is maintained at a pressure level slightly higher than atmospheric whereas the pressure within the outermost chamber is maintained at a pressure slightly below atmospheric.

If the turbine installation includes also a medium or low pressure part arranged successively to a high pressure part, a similarly constructed labyrinth seal is provided in a stuffing box located at each end of the shaft, each such seal including two axially spaced annular chambers, the innermost of which is connected to the intermediate chambers of the labyrinth seals associated with the high pressure part of the turbine and also fed with live steam at a reduced pressure, and the outermost of which is connected to the outermost chambers of the seals associated with the high pressure part of the turbine.

6 Claims, 1 Drawing Figure

US Patent  Sept. 23,1975  3,906,730
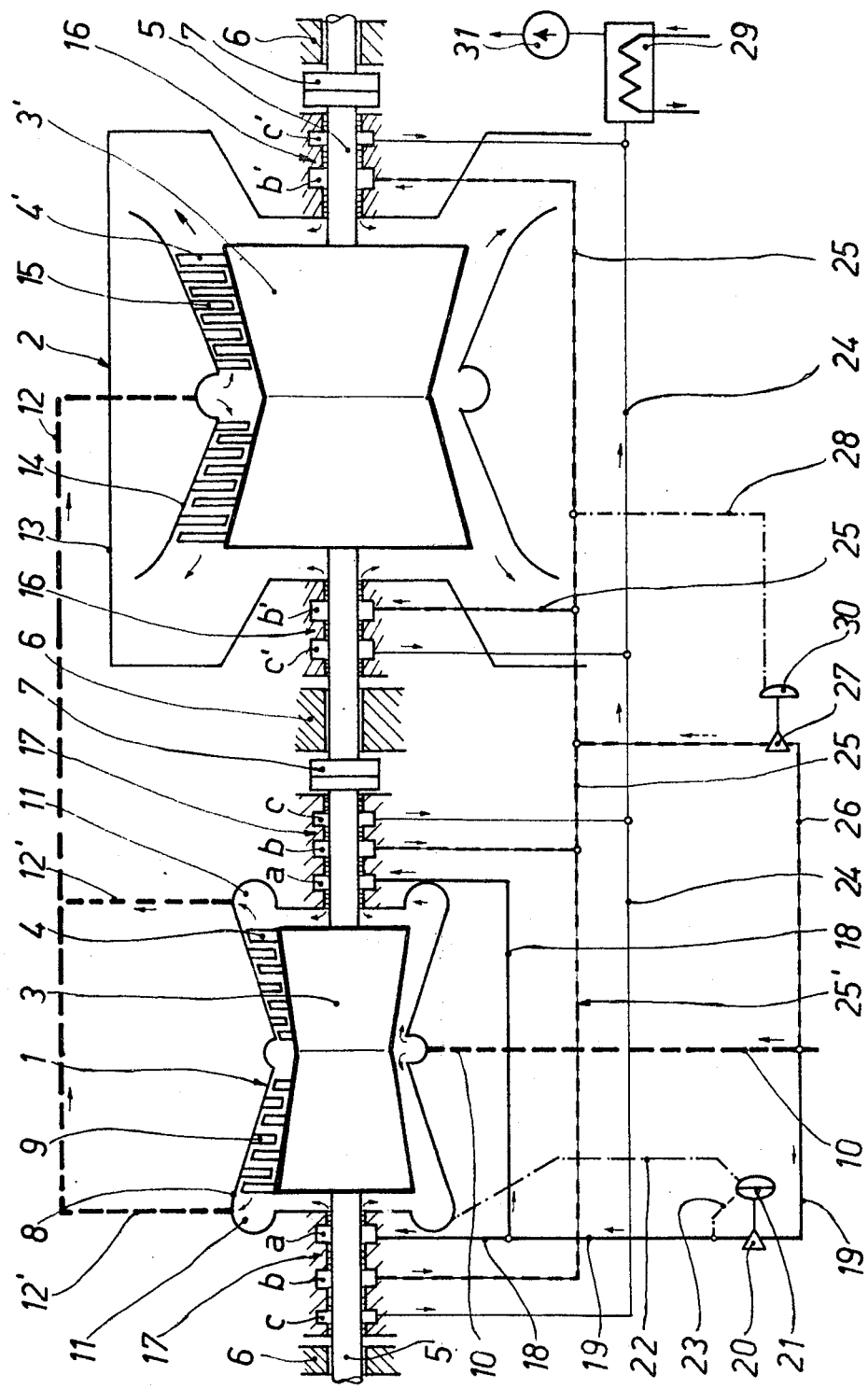

LABYRINTH SEAL WITH BLOCKING MEDIUM

The present invention relates to an improvement in a labyrinth type shaft seal with blocking medium for use in steam turbines, especially for saturated steam turbines used in nuclear power plants, their stuffing box equipped with several chambers which are arranged between the labyrinths, into which a blocking medium is introduced through pipe lines, and from which the blocking medium is drawn off, whereby the axially outermost chamber, which will be referred to as a leakage steam chamber, is connected with a leakage steam condenser and a vacuum pump by way of a pipe line.

In the case of steam turbines used in nuclear power plants, it is not possible to exhaust the steam-air mixture, drawn off at the shaft lead-through, into the ambient atmosphere because there is the danger that the mixture contains radioactive particles. For this reason, plants of this type have been provided with an additional chamber which is placed outside the leakage steam chamber and to which is returned that portion of the steam-air mixture which is drawn off from the leakage steam chamber and has not been condensed by the leakage steam condenser. Since this chamber is always kept at a pressure lower than the ambient atmosphere, the air which is present in this chamber can not escape into the free atmosphere but will flow in a closed cycle.

Saturated steam turbines of nuclear power plants always contain a high percentage of steam moisture at relatively high pressure, and since this is already present within the evaporating section of the high-pressure part, steam in this humid state will by necessity reach the labyrinths of the shaft lead-throughs. It is therefore necessary to protect the stuffing box for the shaft, against the grave effects of erosion, by the use of high grade alloys. The use of such material is costly and requires special machining (can not be welded, for example) and the results obtained do not justify such expenditures.

It is the objective of the present invention to remedy this situation and to overcome the above discussed disadvantages without additional expenditures.

The solution of this problem in accordance with the invention is characterized by the features that the axially innermost chamber, termed the live-steam chamber, is connected with the live steam pipe of the high-pressure part of the steam turbine by way of a pipe containing a regulating valve, and that this regulating valve reduces and then maintains the pressure of the live steam within the live-steam chamber at a pressure slightly above the pressure level of the exhaust steam within the exhaust area of the high-pressure part of the steam turbine, and that a compensating chamber is arranged between the live-steam chamber and the axially outermost leakage steam chamber.

The invention results in the advantage that erosions of the labyrinths for the shaft seal are definitely and completely avoided and without the need to use high-grade alloys for the shaft lead-throughs. This is accomplished by the expansion of the wet steam by means of the regulating valve, with the wet steam losing a large portion of its humidity, or even entering the live-steam chamber in the form of a dry-saturated steam. Furthermore, the pressure of the steam within the live-steam chamber is selected in such manner that the dry-saturated steam will flow only into the exhaust area of the high-pressure part of the steam turbine but not in reverse. Thus, the compensating chamber will be supplied only with dry steam coming from the live-steam chamber.

A particular embodiment of the invention has the characteristics that the regulating valve is equipped with a pressure differential governor, its measuring component being connected with the exhaust space of the steam turbine as well as with the feeder line to the live-steam chamber.

It is also advantageous in the case of steam turbines which possess a medium-pressure or a low-pressure part arranged successively to the high-pressure part, if the compensating chamber and the leakage chamber of the labyrinth seal for the high-pressure part are connected with corresponding chambers at the labyrinth seals for the medium-pressure or the low-pressure part, and if there is inserted in the line connecting the compensating chambers an auxiliary steam-line carrying a valve, and if the leakage chamber is connected with the leakage steam-condenser and a vacuum pump by a common connecting line.

This specific embodiment of the invention makes unnecessary the feeding of superheated steam into the stuffing boxes of the medium-pressure or low-pressure part which would result normally in power losses.

The foregoing objects as well as other advantages inherent in the improved arrangement for the labyrinth type shaft seals will become more apparent from the following detailed description of a preferred embodiment thereof and from the accompanying drawing the single FIGURE of which illustrates, in longitudinal section a steam turbine installation having a multi-stage high-pressure part and a multi-stage low-pressure part, each such part being of the twin, opposite axial flow type.

With reference now to the drawing, the steam turbine is seen to be comprised of a high-pressure multi-stage part 1 and a low-pressure multi-stage part 2. The rotors 3 and 3' of the two parts of the turbine with their blading 4 and 4' are shown in outline form only. The shaft 5 of the steam turbine in two sections is supported by three bearings 6 and the two shaft parts are connected by a coupling 7 located between the high and low-pressure sections 1,2.

The high-pressure housing 8 has a central twin intake design and mounts the guide blading 9. The live steam enters through the central live steam pipe 10, flows in opposite directions through the high-pressure stages and then reaches the exhaust spaces 11 at the opposite ends of the high-pressure part 1. From here the steam collected in pipe lines 12' and 12' is carried over to the central twin-intake low-pressure part 2 by pipe line 12 where it flows into the inner housing 14 and thence in opposite directions through the low-pressure stages.

The housing of the low-pressure part 2 is twin-shelled, its outer housing 13 carrying the shaft lead-throughs 16 and its inner housing 14 supporting the guide blading 15.

The shaft lead-throughs 17 at the high-pressure part 1 consist primarily of the axially spaced annular chambers $a$, $b$ and $c$ and the labyrinth seal elements —not identified by symbols—, located between said chambers, sealing edges of the labyrinths being placed at the shaft as well as at the housing 1.

The axially innermost chambers $a$ at the opposite ends of the high-pressure part 1 which will be termed live-steam chambers, are connected with each other by pipe line 18. Connected into this line 18 is a feeder line 19 which runs into the live-steam pipe 10. A regulating valve 20 is inserted into line 19 and a pressure-differential governor 21 is used as the valve control element and is connected by measuring lines 23 and 22 with the feeder line 19 and with the exhaust space 11 respectively.

Between the exhaust spaces 11 and the feeder line 19, or the live-steam chambers *a* respectively, there is maintained a difference in pressure Δ *p*, for example, preferably of 0.5 to 1.0 bar, the relatively higher pressure being maintained within the live-steam chambers *a* in comparison with the pressure within the exhaust spaces 11. Thus, only dry-saturated steam can reach the interior of the high-pressure part 1 and emerge together with the exhaust steam through the carry-over pipe 12. At the other side of the live-steam chambers *a*, only dry-saturated steam can flow over to the compensating chambers *b* located adjacent and axially outward from chambers *a* with the pressure within each chamber *b* being maintained only slightly above atmospheric pressure, for example at 1.01 bar.

In the leakage chambers *c* located adjacent and axially outward from chambers *b*, there is generated a partial vacuum by means of a vacuum pump 31 which is attached to the connecting line 24. With the aid of this pump the leaking ambient air as well as any steam leaking from the compensating chambers *b* are together drawn off at the leakage chambers *c* in the form of a steam-air mixture. The pressure maintained within the leakage chambers *c*, or within the lines 24 respectively, is kept preferably at 0.98 bar. The steam-air mixture drawn off in this manner is introduced into the leakage steam-condenser 29, and the condensate is fed into the circulating system of the main condenser.

In the case of steam turbines used in nuclear power plants it was found that it will be advantageous for reasons of ecology to introduce clean, superheated steam into the live-steam chambers *a*. Such steam can be produced for example in an auxiliary steam generator, such as a heat exchanger or an electro-boiler. In this manner, the drawn-off steam-air mixture will also be clean and free of fission material. The drawn off air is conducted to an attenuating section. This arrangement will definitely prevent any emission of dangerous materials into the atmosphere, and will also make possible the feeding of dry or superheated steam to the shaft lead-throughs 16 and 17, thus precluding any corrosion damage to the materials normally used.

The shaft lead-through 16 at each end of the low-pressure part 2 is provided with an axially outer leakage chamber *c'* and an adjacent axially inner compensating chamber *b'*, which are connected respectively by way of lines 24, 25 with the corresponding chambers *c* and *b* of the high-pressure part 1. Connected to the line 25, linking compensation chambers *b* and *b'*, is the above mentioned auxiliary-steam line 26 for the throttled, i.e., expanded live steam, which is equipped with a control valve 27. The function of this valve is to control the pressure of the blocking medium within the compensating system 25', comprising the compensating chambers *b* and *b'* as well as the connecting lines 25 and the auxiliary-steam line 26, and to raise the pressure to a predetermined level if this pressure is insufficient. For this purpose the valve 27, inserted into the axuiliary-steam line 26, is provided with a pressure-responsive control 30 which is connected by line 28 to the compensating system 25'.

The invention can also be used, after appropriate changes, in connection with other types of turbines. It is also feasible in the case of conveyance of corrosive or erosive media, to employ the invention in connection with compressors, provided the corrosive or erosive properties of the conveyed medium can be changed by expansion.

We claim:

1. In a steam turbine plant comprising a steam turbine of the multi-stage type and which includes a housing containing multi-stage guide blading and a bladed rotor the shaft of which extends through a labyrinth seal structure provided at the exhaust end of the housing for preventing the steam from leaking outwardly from the end of the housing along the shaft, the improvement wherein said labyrinth shaft seal structure includes at least two chambers spaced axially along the shaft and labyrinth seal elements along the shaft and interposed between said chambers, means for supplying live and substantially dry steam to the axially innermost chamber of said labyrinth shaft seal structure at a pressure slightly higher than the steam pressure existing within the exhaust end of said turbine housing whereby the live and substantially dry steam flows along the shaft and labyrinth seal elements from said axially innermost chamber in an axially inward direction into the exhaust end of said turbine housing and in an axially outward direction to said axially outermost chamber, and a line extending from the axially outermost chamber of said labyrinth shaft seal structure to a vacuum pump for drawing off leakage air entering said axially outermost chamber from the ambient atmosphere as well as steam leaking thereinto from said axially innermost chamber.

2. A steam turbine plant as defined in claim 1 wherein said means for supplying live and substantially dry steam to the axially innermost chamber of said labyrinth shaft seal structure includes a branch line extending thereto from the main line supplying the live steam to the turbine and said branch line includes a pressure-reducing valve controlled in accordance with the pressure differential existing between said axially innermost chamber and the exhaust end of said housing for drying the live steam.

3. A steam turbine plant as defined in claim 1 wherein said line extending from said axially outermost chamber of said labyrinth shaft seal structure includes a condenser in addition to said vacuum pump.

4. A steam turbine plant as defined in claim 1 wherein said means for supplying live and substantially dry steam to the axially innermost chamber of said labyrinth shaft seal structure includes a separate steam generator producing clean super-heated steam.

5. In a steam turbine plant comprising a center intake multi-stage high-pressure section interconnected with a center intake multi-stage lower-pressure section, each said section including a housing containing multi-stage guide blading and a bladed rotor, and wherein the respective shafts for said rotors are coupled together and extend through labyrinth seal structures provided at the opposite exhaust ends of their respective housings for preventing steam from leaking outwardly from said housings along said shafts, the improvement wherein said labyrinth shaft seal structures associated with the high-pressure turbine section each include three chambers spaced axially along the shaft and labyrinth seal elements interposed therebetween, and the labyrinth shaft seal structures associated with the lower-pressure turbine section each include two chambers spaced axially along the shaft and labyrinth seal elements interposed therebetween, a first branch line containing a pressure-reducing valve therein for supplying live and substantially dry steam from the steam input line for said center steam intake of said high-pressure turbine section to the axially innermost chambers of the labyrinth shaft seal structures associated with the high-pressure turbine section at a pressure slightly higher than the steam pressure existing at the exhaust ends of its housing whereby the live and substantially dry steam flows along the shaft and labyrinth seal elements from said axially innermost chambers in axially inward directions into the exhaust ends of the housing of said high-pressure turbine section and in axially outward directions into compensating chambers located intermediate the axially innermost and outermost chambers, a line interconnecting said intermediate compensating chambers of the labyrinth shaft seal structures associated with the high-pressure turbine section with the axially innermost chambers of the labyrinth shaft seal structures associated with the lower-pressure turbine section for supplying live and substantially dry steam from said intermediate compensating chambers to said axially innermost chambers of the labyrinth shaft seal structures associated with the lower-pressure turbine section of a pressure slightly higher than the steam pressure at the exhaust ends of its housing whereby the live and substantially dry steam flows along the shaft and labyrinth seal elements from said axially innermost chambers in axially inward directions into the exhaust ends of the housing of the lower-pressure turbine section and in axially outward directions into the axially outermost chambers, a second branch line including a pressure regulating valve therein extending from the steam input line for said center steam intake of said high-pressure turbine section to said line which interconnects said intermediate compensating chambers of the labyrinth shaft seal structures associated with the high-pressure turbine section with the axially innermost chambers of the labyrinth shaft seal structures associated with the lower-pressure turbine section, said pressure-regulating valve in said second branch line being responsive to the pressure in said interconnecting line between said chambers and providing additional live and substantially dry steam as necessary to maintain the steam pressure in said interconnecting line at a predetermined level, and a line extending from the axially outermost chambers of the labyrinth shaft seal structures associated with both of said turbine sections to a condenser and vacuum pump for drawing off leakage air entering said axially outermost chambers from the atmosphere as well as steam leaking thereinto from the intermediate compensating chambers of the labyrinth shaft seal structures associated with the high-pressure turbine section as well as from the axially outermost chambers of the labyrinth shaft seal structures associated with the lower-pressure turbine section.

6. A steam turbine plant as defined in claim 5 and wherein said pressure-reducing valve in said first branch line is controlled in accordance with the pressure differential existing between said axially innermost chambers of the labyrinth shaft seal structures and the exhaust end of said housing of said high-pressure turbine section.

* * * * *